United States Patent [19]
Ehrreich

[11] Patent Number: 5,207,950
[45] Date of Patent: May 4, 1993

[54] POLYMER COMPOSITION CONTAINING CHLORIDED CONDUCTIVE PARTICLES

[75] Inventor: John Ehrreich, Maynard, Mass.

[73] Assignee: Ercon, Inc., Waltham, Mass.

[21] Appl. No.: 324,420

[22] Filed: Mar. 16, 1989

[51] Int. Cl.$^5$ .............................................. H01B 1/22
[52] U.S. Cl. .................................. 252/518; 252/514; 252/512; 428/46; 428/403
[58] Field of Search ................ 252/514, 518; 428/403; 128/460; 423/46

[56] References Cited

U.S. PATENT DOCUMENTS

| | | | |
|---|---|---|---|
| 3,834,373 | 9/1974 | Sato | 252/514 |
| 4,377,170 | 3/1983 | Carim | 252/521 |
| 5,051,204 | 9/1991 | Bowns et al. | 252/518 |

FOREIGN PATENT DOCUMENTS 0144741  6/1985  European Pat. Off. .
86/02732  5/1986  World Int. Prop. O. .

OTHER PUBLICATIONS

Spardaro et al, "Silver Polymethyl Methacrylate Antibacterial Bone Cement", *Clin. Orthop.*

Primary Examiner—Paul Lieberman
Assistant Examiner—Bradley A. Swope
Attorney, Agent, or Firm—Lahive & Cockfield

[57] ABSTRACT

A composition comprising chlorided and non-chlorided conductive particles and polymeric material selected from the group of polymers, pre-polymers and mixtures thereof wherein at least about 5 percent by weight of the particles included in the composition have been subjected to treatment such that the particles have chloride at least on their surface prior to inclusion in the composition.

64 Claims, No Drawings

POLYMER COMPOSITION CONTAINING CHLORIDED CONDUCTIVE PARTICLES

BACKGROUND OF THE INVENTION

The present invention relates to polymer compositions containing conductive particles and more particularly to polymer compositions containing metal-based conductive particles and chlorided metal-based conductive particles in such a manner as to render the composition suitable for use as an electrode surface which is to be exposed to an aqueous environment, as an oxidizing source in intimate contact with a conductive material in a battery, or as a convenient source of silver in touch up electroplating systems.

Ink and plastic formulations have been employed in the past as coatings, layers or surfaces on electrode components. Such formulations as for example described in U.S. Pat. No. 4,592,961 (Ehrreich), U.S. Pat. No. 4,371,459 (Nazarenko), and U.S. Pat. No. 4,425,263 (Nazarenko), include highly conductive particles for purposes of imparting conductivity to the polymer based composition without regard to providing the composition with resistance to harsh or potentially degradative environments and without regard to controlling the electroconductivity of the polymer composition against voltage drift or resistance increase, especially in a direct current environment.

The compositions of the invention are particularly useful as electrode components or as coatings on electrode components which are to be exposed to aqueous environments such as in body electrodes, described for example in U.S. Pat. Nos. 3,976,055; 4,257,424; and 3,977,392, and as are otherwise commercially available. By coating an electrode surface with a composition according to the invention at least over the area which is to be exposed to an electroconductive aqueous environment, the electrode may be protected from electrical degradation and may be stabilized as to electroconductivity.

In accordance with the invention there is provided a composition comprising conductive particles and polymeric material selected from the group of polymers, pre-polymers and mixtures thereof wherein at least about 5 percent by weight of the particles included in the composition have been subjected to treatment such that the particles have chloride at least on their surface prior to inclusion in the composition. In application where a liquid ink is desired, the composition may further include a solvent compatible with the polymeric material and the treated particles.

The particles preferably comprise a metal-based material selected from the group of noble metals, noble metal oxides, and mixtures thereof.

The conductive particles subjected to the pre-chloriding treatment are typically either a noble metal or a noble metal oxide, and are typically coated at least on their surfaces with noble metal chloride as a result of the chloriding treatment.

The noble metal particles selected are most preferably silver metal particles and the noble metal oxides selected are most preferably silver oxide particles. The untreated particles included in the composition may be a mixture of noble metal and noble metal oxide, and the chlorided particles may be a mixture of chlorided noble metal particles and chlorided noble metal oxide particles. Preferably the untreated particles included in the composition are either a noble metal or a noble metal oxide and the treated particles are either a chlorided noble metal or a chlorided noble metal oxide. Most preferably the untreated and treated particles have the same noble metal base. And, typically, the untreated and treated particles are both noble metal-based or noble metal oxide based.

Where a composition according to the invention is used as a coating on a non-conductive substrate, the composition includes at least enough noble metal particles as are necessary to render the composition conductive when in a dry state, for example, an ink coated and dried on a non-conductive substrate.

The polymeric material of the composition is preferably selected from the group of polyesters, vinyl chloride copolymers, vinylidene chloride copolymers, polyurethanes, ethylene copolymers, acrylate polymers, acrylate copolymers, and mixtures thereof. The solvent material, if any, of the composition is preferably selected from the group of ketones, esters, and mixtures thereof.

Most preferably the ratio of chlorided particles to untreated conductive particles included in the composition is selected such that the composition is or remains conductive.

Also in accordance with the invention there is provided a product comprising a composition according to the invention coated on a substrate. The substrate is a dimensionally stable material which is typically non-conductive but may also be conductive. Such coatings are typically accomplished by coating an ink composition according to the invention on a substrate and evaporating any solvent from the coating, e.g., by heating, air drying, or the like. Such coatings may be selectively coated on a suitable substrate in any desired pattern, e.g., in a predetermined printed circuit-like pattern.

Further in accordance with the invention, there is provided a process for making a conductive polymer composition comprising selecting a suitable polymeric material, selecting a suitable metal-based particle material, selecting a suitable metal-based particle material for chloriding, pre-chloriding the selected metal-based particle material, admixing the polymeric material, the metal-based particles and the pre-chlorided metal-based particles, and optionally admixing a compatible solvent.

Further in accordance with the invention, there is provided a process for making a coated product comprising selecting a suitable substrate, selecting a metal-based particle material, subjecting the metal-based particle material to a pre-chloriding treatment such that the particles have metal chloride at least on their surfaces, forming a homogeneous solution comprising the selected polymeric material and a suitable solvent, admixing the treated particles therewith to form a homogeneous solution of the polymeric material and the treated particles, admixing a noble metal particle material with the solution at least when the selected substrate is non-conductive, optionally admixing a noble metal particle material with the solution when the selected substrate is conductive, coating the admixed solution on the the substrate in a predetermined pattern or otherwise, and evaporating the solvent from the coating on the substrate.

SUMMARY OF THE INVENTION

The present invention provides a novel composition containing a non-conductive polymer and a metal-based particle material. The metal-based particle material typically comprises a mixture of conductive metal-based particles and metal-based particles which have been pre-treated to form metal chloride at least on the surface of the particles so treated. Such pre-chloriding treatment prior to inclusion of the particles in the composition allows the size of the particles to be maintained, thus avoiding agglomeration or fusion of metal chloride and thus allows the chlorided particles to be homogeneously dispersed in the polymer composition rendering the composition more readily coatable when in the form of an ink and renders it a better conductor.

The metal-based particles are typically a noble metal or noble metal oxide. The chloriding pre-treatment is typically carried out on the selected metal-based material by subjecting the metal-based material to treatment with a metal chloride-forming solution, such as aqueous solutions of sodium hypochlorite, ferric chloride, sodium chloride or potassium chloride. Other conventional metal chloride-forming agents may be employed depending on the particular metal-based material to be chlorided. The metal-based material may be used in any conventional particle form, such as flake, spherical, granular, chopped filament, or other powder forms. The maximum length of a particle in any one dimension is preferably less than about 0.25 inches.

For example, where silver flake or powder is selected as the metal-based material, the silver is typically chlorided by subjecting the silver to treatment with a sodium hypochlorite or ferric chloride aqueous solution at a concentration and temperature and for a period of time at least sufficient to form a silver chloride layer on the surface of the treated particles (powder or flake). Where silver oxide is, for example, selected as the metal-based particle material, it is typically chlorided with an aqueous sodium chloride or potassium chloride solution. Whatever chloriding treatment process is employed, it is carried out at a concentration and temperature and for a time sufficient to form metal chloride at least on the surface of the selected metal-based material.

The composition of the untreated and treated metal-based material which is ultimately combined with the polymeric material may comprise a mixture of more than one noble metal-based material and more than one chlorided metal-based material. Where a mixture of noble metal-based materials is used, the materials are selected to be compatible with each other, at least such that corrosion of the particles will not occur. The metal-based material added to the polymeric material typically comprises a single noble metal-based material such as silver/chlorided silver, silver/chlorided silver oxide, silver oxide/chlorided silver oxide, silver oxide/chlorided silver, and the like. The chlorided particles are homogeneously dispersed throughout the composition.

The untreated and treated metal-based materials which are to be combined with the polymeric material may be premixed and added as a homogeneous mixture of untreated metal-based material and chlorided metal-based material, to the polymeric material. Typically, the untreated and chlorided metal-based materials are separately added to and homogeneously mixed with the polymeric material. For example, a conventional untreated metal-containing polymer composition, such as a commercially available conductive ink or plastic, may be modified to achieve a composition according to the invention by, for example, removing preferably all or less preferably a portion of the conductive particles from the commercial composition, and admixing therewith metal-based particles which have been pre-chlorided and preferably admixing untreated conductive particles.

Removal of all or a portion of the conductive particles from a commercial preparation may be carried out in any conventional manner. For example with respect to a commercial ink composition, the composition may be allowed to settle over relatively long periods of time, or may be centrifuged to more quickly remove the conductive particles therefrom with the addition of a suitable solvent in order to pre-dilute the preparation, if necessary, to aid in the removal of the desired amount of particles. Other conventional means may be employed such as filtration to remove a desired amount of conductive particles from commercially available preparations for purposes of replacement with chlorided particles. Alternatively, a desired amount of pre-chlorided and untreated metal-based material may simply be added to commercial solutions.

Whether the ultimate composition according to the invention is manufactured solely from individual starting materials or is attained by modifying known, commercially available compositions, the object of the invention is to obtain a polymeric material combined with a pre-selected ratio of untreated, metal-based material and pre-chlorided, metal-based particle material, with the untreated and treated metal-based materials being homogeneously dispersed throughout the composition. Most preferably, treated metal-based material is at least 5% by weight of the total metal-based material in the composition and the treated metal-based material may comprise as much as 100% of the total metal-based material in the composition.

The ultimate polymer/metal-based material compositions according to the invention may take the form of dimensionally stable plastics or inks, and are useful as, or in conjunction with, the construction of electrodes, particularly electrodes which are intended for use in contact with conductive, aqueous environments, such as body electrodes.

In embodiments of the invention where the composition is made into the form of an ink, a suitable solvent is combined with the polymeric material and the metal-based material. Such solvents are typically selected on the basis of their compatibility with the polymer material(s) selected for use in the inventive composition. Inasmuch as the purpose of an ink composition is typically for its application to the surface of a substrate, preferred polymeric materials are those which have good adhesion and binding properties when the solvent is evaporated. Examples of preferred polymeric materials for inclusion in a composition according to the invention are polyesters, vinyl chloride co-polymers, vinylidene chloride co-polymers, polyurethanes, ethylene co-polymers, acrylate polymers, and acrylate co-polymers. Typical solvents which may be useful in conjunction with one or more of such polymers are ketones such as acetone, methyl ethyl ketone, isophorone, and the like; esters such as a dibasic ester (e.g., DBE, E.I. DuPont de Nemours, Wilmington, Del.), propylene glycol methyl ether acetate, 2-ethoxyethylacetate, and the like. Mixtures of two more of the foregoing polymers and mixtures of two or more of the foregoing solvents may also be employed depending upon the compatibility of the polymers and solvents selected.

Ink compositions according to the invention may be applied as a uniform layer across the entire surface of an electrode component substrate or may be selectively coated on selected areas of the surface in a pattern so as to render certain areas conductive, partially conductive, or non-conductive, as desired. Selective coating on an electrode component surface may be desired, for example, to selectively coat one area which is intended to come in contact with a conductive, aqueous environment and insulate that area from another area of the electrode surface by not coating that area. Coating of an electrode component surface, selective or otherwise, may be achieved in any conventional manner, such as by screen printing; reverse roll coating (pan- or nip-fed); knife-over roll coating; gravure coating (direct or offset); embossed roll coating; Mayer rod coating; curtain coating; and the like.

Electrode components which may be coated with ink compositions according to the invention, typically comprise a dimensionally stable non-conductive inert plastic substrate (rigid or flexible), such as a polycarbonate, polyester, polyvinyl, or other inert polymer. In some applications, an electrode component acting as a substrate for the inks of the invention may itself be conductive. In such applications where an inert, non-conductive plastic is employed to comprise the substrate, one or more conductive fillers may be admixed with the plastic to render the electrode substrate conductive, such as conductive metal flakes and powders, carbon or graphite powders and filaments and the like. Alternatively, in such applications the electrode substrate may comprise any suitable dimensionally stable, conductive material such as a corrosion resistant metal.

In applications where an ink composition according to the invention is coated on a conductive electrode component substrate, the degree of conductivity of the ink composition, once applied, may be less or more than the conductivity of the substrate itself, with the ink formulation acting as a protective surface-coating and also as a stabilizing surface which limits the amount of drift in electrical measurements which may be recorded with the component.

DETAILED DESCRIPTION OF EXEMPLARY PREFERRED EMBODIMENTS OF THE INVENTION

The following discussion sets forth exemplary procedures for preparing a variety of exemplary compositions according to the invention.

Pre-Treatment with Sodium Hypochlorite (NaOCl)

A. 160 grams of Silver Flake #65 (Metz Metallurgical Corporation, Ridgefield, N.J.) was admixed with 400 ml of denatured alcohol (primarily ethanol containing a small amount of methanol) and then, with mixing, quickly added 1600 ml of regular Clorox ® bleach (5.25% NaOCl in water; (Clorox Corporation., Oakland, Calif.), and continued mixing with mechanical agitation was carried out for about three minutes. The chloride coated silver particles were then allowed to settle and the supernatant liquid decanted off.

B. One gallon of tap water was added to the treated particles obtained in Step A, the mixture was mechanically agitated, the particles allowed to settle and the liquid supernatant then decanted off. The same procedure was repeated once again.

C. 1200 ml of acetone was added to the particles obtained from Step B, the mixture was mechanically agitated, the particles allowed to settle, and the liquid supernatant decanted off. This procedure was repeated three times.

EXAMPLE I

Conductive ink E-1700 (a silver flake/polymer/solvent composition available from Ercon, Inc., Waltham, Mass.) was centrifuged to separate some of the polymer solution from the silver flake therein. 334 grams of this separated polymer solution was added to and admixed with all of the treated particle material obtained from Step C of the chloriding pre-treatment described above containing 200 grams of retained acetone. Then 340 grams of untreated Silver Flake #65 was admixed with the polymer/treated particle/acetone mixture.

The resulting ink, unlike conventional E-1700, when incorporated into a body electrode, like that described in U.S. Pat. No. 3,977,392, will not result in large voltage drifts in direct current environments.

The resulting ink was screen-printed with a 305 polyester mesh screen onto a 5 mil thick ICI 505 polyester sheet and dried in an oven for 0.5 hours at 97° C. The dried ink layer exhibited a resistance of 1.6 ohms/sq.

EXAMPLE II

Steps A, B and C of the above-described pre-chloride treatment were carried out on 160 grams of Silver Flake #7 (Metz Metallurgical Corporation, So. Plainfield, N.J.).

100 grams of VAGH, a vinyl chloride co-polymer (Union Carbide Corporation, New York, N.Y.) was dissolved in 400 grams of Isophorone.

334 grams of the VAGH/Isophorone solution was admixed with all of the chlorided Silver Flake #7 in 300 grams of retained acetone solvent from Step C of the chloriding treatment. To this admixture 340 grams of untreated Silver Flake #7 was added and admixed to obtain another ink composition according to the invention.

EXAMPLE III

Steps A, B and C of the above-described chloriding treatment was carried out on 80 grams of Silver Flake 50-S (Metz Metallurgical Corporation).

320 grams of polymer solution from E-1700 conductive ink was obtained by centrifuging.

All of the pre-chlorided Silver Flake 50-S in 244 grams of retained acetone from Step C was mixed with the 320 grams of the polymer solution obtained from E-1700 to obtain another conductive ink according to the invention.

EXAMPLE IV

Steps A, B and C of the above-described pre-chloriding treatment were carried out on 160 grams of Silver Powder C-200 (Metz Metallurgical Corporation).

To the resulting pre-chlorided Silver powder C-200, 1200 ml of MEK (methyl ethyl ketone) was added, admixed and decanted off.

All of the treated Silver Powder C-200 contained 188 grams of the retained MEK as a result of the wash procedure described. To this combination was added and admixed 268 grams of 25 weight percent polyester Vitel PE 200 (Goodyear Tire & Rubber Company, Akron, Ohio) dissolved in dibasic ester solvent, DBE (E.I. DuPont Nemours, Wilmington, Del.) and 340 grams of untreated Silver Flake #7. Another conductive ink according to the invention was thus obtained.

EXAMPLE V

Steps A, B and C of the pre-chloriding treatment described above, were carried out on 160 grams of silver coated glass beads, S-3000-S3 (Potters Industries, Inc., Parsippany, N.J.).

320 grams of polymer solution from E-1700 was obtained by centrifuging. The beads obtained from Step C of the chloriding pre-treatment in 120 grams of retained acetone from Step C were added to the 320 grams of the polymer solution. Another conductive ink according to the invention was thus obtained.

EXAMPLE VI

To 62.7 grams of particulate silver oxide, $Ag_2O$ (Metz Metallurgical Corporation) dispersed in 105.3 grams of water with continuous mixing was added 2000 ml of an aqueous solution of 3% by weight sodium chloride. This admixture was mixed for about five minutes, the particulate material was allowed to settle and the supernatant liquid was decanted off.

To the resulting chlorided particulate material while mixing was added 2000 ml of an aqueous solution of 3% by weight sodium chloride. This admixture was mixed for about three minutes, the particulate material allowed to settle, and the supernatant liquid decanted off. This treatment with 3% sodium chloride was repeated.

To the resulting particulate material was added 2000 ml of tap water. This admixture was mixed for about sixty seconds, the particulate material allowed to settle, and the supernatant liquid decanted off. This tap water wash treatment was repeated three times.

To the resulting particulate material was added 500 ml of acetone. This admixture was mixed for about sixty seconds, the particulate material allowed to settle, and the supernatant liquid decanted off. This acetone wash treatment was repeated three times. On the last acetone wash only so much of the acetone was decanted off as to leave behind a total acetone/wet chlorided particle mixture weiqhinq 100 grams.

80 grams of polymer solution from E-1700 ink was obtained by centrifuging. The 80 grams of the polymer solution from E-1700 was added to and admixed with the 100 grams of the acetone/wet chlorided particles (chlorided, washed, rinsed, and decanted) and 62 grams of Silver Flake #65 (Metz Metallurgical Corporation). An ink composition according to the invention was thus obtained.

EXAMPLE VII

A 5 mil thick sheet of ICI 505 polyester film was selected. On a 5"×8" area of the surface of the polyester film, a conventional conductive ink, E-1400 (a polymer/silver flake/solvent composition commercially available from Ercon, Inc., Waltham, Mass.) was screen coated with a 305 polyester mesh screen. The resulting screen coated film was dried in an oven for 0.5 hours at 97° C. The resulting product polyester film with a dried, highly conductive polymer/silver flake coating adhered thereto over a 5"×8" area. The resistance of the dried coating was 0.08 ohm/sq.

The ink composition obtained by the procedure of Example III above, was then knife-coated on top of the 5"×8" dried E-1400 coating of the resultant film described above. The knife-coating covered only a 5"×4" area and was selectively coated in a pattern of stripes 0.75" wide, spaced 0.75" apart. The knife-coated product was then dried in an oven for about 0.5 hours at 97° C. The resistance of the dried knife-coated coating was 0.33 ohms/sq.

The resulting product was a successfully coated substrate having a highly conductive coating adhered to the surface of the substrate and another coating of polymer/chlorided silver composition selectively adhered in a pattern to the outer surface of the highly conductive coating. The various coating operations of this example were easily carried out and more complicated patterns of coating could also have been readily carried out by conventional coating procedures, such as knife coating, screen coating and the like.

I claim:

1. A composition comprising chlorided and non-chlorided conductive particles and organic material selected from the group consisting of polymers, pre-polymers and mixtures thereof wherein at least about 5 percent by weight of the particles included in the composition are particles which were formed and subsequently chlorided prior to inclusion in the composition such that the particles have noble metal chloride at least on their surface prior to inclusion in the composition.

2. The composition of claim 1, further comprising a compatible solvent.

3. The composition of claim 1, wherein the particles comprise a metal-based material selected from the group consisting of noble metals, noble metal oxides and mixtures thereof 4. The composition of claim 2, wherein the particles comprise a metal-based material selected from the group consisting of noble metals, noble metal oxides and mixtures thereof.

5. The composition of claim 1, wherein the at least about 5 percent of the particles are coated with a noble metal chloride by the chloriding treatment.

6. The composition of claim 2, wherein the at least about 5 percent of the particles are coated with a noble metal chloride by the chloriding treatment.

7. The composition of claim 3, wherein the at least about 5 percent of the particles are coated with a noble metal chloride by the chloriding treatment.

8. The composition of claim 1, wherein the particles subjected to the treatment prior to inclusion in the composition comprise metal-based particles selected from the group consisting of noble metals and noble metal oxides.

9. The composition of claim 2, wherein the particles subjected to the treatment prior to inclusion in the composition comprise metal-based particles selected from the group consisting of noble metals and noble metal oxides.

10. The composition of claim 3, wherein the particles subjected to the treatment prior to inclusion in the composition comprise metal-based particles selected from the group consisting of noble metals and noble metal oxides.

11. The composition of claim 5, wherein the particles subjected to the treatment prior to inclusion in the composition comprise metal-based particles selected from the group consisting of noble metals and noble metal oxides.

12. The composition of claim 7, wherein the particles subjected to the treatment prior to inclusion in the composition comprise metal-based particles selected from the group consisting of noble metals and noble metal oxides.

13. The composition of claim 3, wherein the noble metal oxide is silver oxide.

14. The composition of claim 7, wherein the noble metal oxide is silver oxide.

15. The composition of claim 12, wherein the noble metal oxide is silver oxide.

16. The composition of claim 12, wherein the particles subjected to the treatment prior to inclusion in the composition are silver oxide and the noble metal chloride is silver chloride.

17. The composition of claim 1, wherein the particles subjected to the treatment prior to inclusion in the composition are silver oxide subjected to the treatment with chloride.

18. The composition of claim 2, wherein the particles subjected to the treatment prior to inclusion in the composition are silver oxide subjected to the treatment with chloride.

19. The composition of claim 1, wherein the organic material is selected from the group consisting of polyester, vinyl chloride copolymers, vinylidene chloride copolymers, polyurethane, ethylene copolymers, acrylate polymers, acrylate copolymers and mixtures thereof.

20. The composition of claim 2, wherein the organic material is selected from the group consisting of polyester, vinyl chloride copolymers, vinylidene chloride copolymers, polyurethane, ethylene copolymers, acrylate polymers, acrylate copolymers and mixtures thereof.

21. The composition of claim 3, wherein the organic material is selected from the group consisting of polyester, vinyl chloride copolymers, vinylidene chloride copolymers, polyurethane, ethylene copolymers, acrylate polymers, acrylate copolymers and mixtures thereof.

22. The composition of claim 5, wherein the organic material is selected from the group consisting of polyester, vinyl chloride copolymers, vinylidene chloride copolymers, polyurethane, ethylene copolymers, acrylate polymers, acrylate copolymers and mixtures thereof.

23. The composition of claim 8, wherein the organic material is selected from the group consisting of polyester, vinyl chloride copolymers, vinylidene chloride copolymers, polyurethane, ethylene copolymers, acrylate polymers, acrylate copolymers and mixtures thereof.

24. The composition of claim 2, wherein the solvent is selected from the group consisting of ketones, esters and mixtures thereof.

25. The composition of claim 4, wherein the solvent is selected from the group consisting of ketones, esters and mixtures thereof.

26. The composition of claim 20, wherein the solvent is selected from the group consisting of ketones, esters and mixtures thereof.

27. The composition of claim 1, wherein the composition is conductive.

28. The composition of claim 16, wherein the composition is conductive.

29. The composition of claim 2, wherein the composition is conductive upon evaporation of the solvent from the composition.

30. The composition of claim 18, wherein the composition is conductive upon evaporation of the solvent from the composition.

31. The composition of claim 4, wherein the particles subjected to the treatment prior to inclusion in the composition are coated with a noble metal chloride by the chloriding treatment.

32. The composition of claim 31, wherein the organic material is selected from the group consisting of polyester, vinyl chloride copolymers, vinylidene chloride copolymers, polyurethane, ethylene copolymers, acrylate polymers, acrylate copolymers and mixtures thereof.

33. The composition of claim 32, wherein the solvent is selected from the group consisting of ketones, esters and mixtures thereof.

34. The composition of claim 1, wherein the particles comprise a metal-based material selected from the group consisting of silver, silver oxide and mixtures thereof.

35. The composition of claim 34, wherein the particles subjected to the treatment prior to inclusion in the composition are silver particles.

36. The composition of claim 34, wherein the particles subjected to the treatment prior to inclusion in the composition are silver oxide particles.

37. The composition of claim 35 wherein the particles included in the composition comprise silver particles and silver particles subjected to the treatment prior to their inclusion in the composition.

38. The composition of claim 36 wherein the particles included in the composition comprise silver particles and silver oxide particles subjected to the treatment prior to their inclusion in the composition.

39. The composition of claim 35 wherein the particles included in the composition comprise silver oxide particles and silver particles subjected to the treatment prior to their inclusion in the composition.

40. The composition of claim 36 wherein the particles included in the composition comprise silver oxide particles and silver oxide particles subjected to the treatment prior to their inclusion in the composition.

41. A composition comprising chlorided and non-chlorided conductive particles selected from the group consisting of noble metal particles, noble metal oxide particles, noble metal coated particles, and mixtures thereof and organic materials selected from the group consisting of polymers, pre-polymers, and mixtures thereof wherein at least about 5% by weight of the particles included in the composition are particles which were formed and subsequently chlorided prior to inclusion in the composition such that the particles have noble metal chloride at least on their surface, prior to inclusion in the composition.

42. A composition as claimed in claim 41 wherein the organic material is selected from the group consisting of polyester, vinyl chloride copolymers, vinylidene chloride copolymers, polyurethane, ethylene copolymers, acrylate polymers, acrylate copolymers and mixtures thereof.

43. A composition as claimed in claim 41 wherein the particles are chlorided using a noble metal chloride-forming solution.

44. A composition as claimed in claim 42 wherein the particles are chlorided using a noble metal chloride-forming solution.

45. A composition comprising chlorided and non-chlorided conductive particles and an organic material selected from the group consisting of polyester, vinyl chloride copolymers, vinylidene chloride copolymers, polyurethane, ethylene copolymers, acrylate polymers, acrylate copolymers and mixtures thereof wherein at least about 5% by weight of the particles included in the composition are particles which were formed and subsequently chlorided prior to inclusion in the composition such that the particles have noble metal chloride at least on their surface prior to inclusion in the composition.

46. A composition as claimed in claim 45 wherein the conductive particles are selected from the group consisting of noble metal particles, noble metal oxide particles, noble metal coated particles and mixtures thereof.

47. A composition as claimed in claim 45 wherein the particles are chlorided using a noble metal chloride-forming solution.

48. A composition as claimed in claim 46 wherein the particles are chlorided using a noble metal chloride-forming solution.

49. A composition as claimed in any one of claims 1, 3, 13, 16 or 41 wherein the particles are flakes.

50. A composition as claimed in any one of claims 1, 3, 13, 16 or 41 wherein the particles are homogeneously dispersed in the organic material.

51. A composition as claimed in any one of claims 1, 3, 13, 16 or 41 wherein about 5% of the particles have noble metal chloride at least on their surface prior to inclusion in the composition.

52. A combination of a composition and a non-chlorided conductive material, comprising:
   a first composition comprising conductive particles and organic material selected from the group consisting of polymers, pre-polymers and mixtures thereof wherein at least about 5 percent by weight of the particles included in the composition are particles which were formed and subsequently chlorided prior to inclusion in the composition such that the particles have noble metal chloride at least on their surface prior to inclusion in the composition; and
   a second non-chlorided conductive material in contact with the first composition.

53. A combination of a composition and a conductive material as claimed in claim 52 wherein the composition further comprises a compatible solvent and the composition is in contact with the conductive material upon evaporation of the solvent from the composition.

54. A combination as claimed in any one of claims 52-53 wherein the substrate is conductive.

55. A conductive composition comprising chlorided and non-chlorided conductive particles and organic material selected from the group consisting of polymers, pre-polymers and mixtures thereof wherein at least about 5 percent by weight of the particles included in the composition are particles which were formed and subsequently chlorided prior to inclusion in the conductive composition such that the particles have noble metal chloride at least on their surface prior to inclusion in the conductive composition.

56. The conductive composition of claim 55, wherein the particles comprise a metal-based material selected from the group consisting of noble metals, noble metal oxides and mixtures thereof.

57. The conductive composition of claim 55, wherein the at least about 5 percent of the particles are coated with a noble metal chloride by the chloriding treatment.

58. The conductive composition of claim 56, wherein the at least about 5 percent of the particles are coated with a noble metal chloride by the chloriding treatment.

59. The conductive composition of claim 56, wherein the particles subjected to the treatment prior to inclusion in the composition are silver oxide and the noble metal chloride is silver chloride.

60. The conductive composition of claim 55, wherein the polymeric material is selected from the group consisting of polyester, vinyl chloride copolymers, vinylidene chloride copolymers, polyurethane, ethylene copolymers, acrylate polymers, acrylate copolymers and mixtures thereof.

61. The conductive composition of claim 56, wherein the polymeric material is selected from the group consisting of polyester, vinyl chloride copolymers, vinylidene chloride copolymers, polyurethane, ethylene copolymers, acrylate polymers, acrylate copolymers and mixtures thereof.

62. A conductor composition comprising chlorided and non-chlorided conductive particles and organic material selected from the group consisting of polymers, pre-polymers and mixtures thereof wherein at least about 5 percent by weight of the particles included in the composition are particles which were formed and subsequently chlorided prior to inclusion in the composition such that the particles have noble metal chloride at least on their surface prior to inclusion in the composition.

63. A composition as claimed in any one of claims 41, 45, and 52, wherein the composition is conductive.

64. A composition as claimed in claim 63 wherein the organic material is a polyester.

* * * * *